US009159182B2

(12) United States Patent
Sagady et al.

(10) Patent No.: US 9,159,182 B2
(45) Date of Patent: Oct. 13, 2015

(54) VENDING APPROVAL SYSTEMS, METHODS, AND APPARATUS USING CARD READERS

(71) Applicant: USA Technologies, Inc., Malvern, PA (US)

(72) Inventors: Cary M. Sagady, Chester Springs, PA (US); Joseph A. Simpkins, West Chester, PA (US)

(73) Assignee: USA Technologies, Inc., Malvern, PA (US)

( * ) Notice: Subject to any disclaimer, the term of this patent is extended or adjusted under 35 U.S.C. 154(b) by 0 days.

(21) Appl. No.: 14/015,150

(22) Filed: Aug. 30, 2013

(65) Prior Publication Data

US 2015/0060542 A1  Mar. 5, 2015

(51) Int. Cl.
*G06F 7/08* (2006.01)
*G07F 7/12* (2006.01)
*G06Q 20/34* (2012.01)
*G06Q 20/36* (2012.01)
*G07F 7/08* (2006.01)

(52) U.S. Cl.
CPC ............... *G07F 7/12* (2013.01); *G06Q 20/352* (2013.01); *G06Q 20/36* (2013.01); *G07F 7/0893* (2013.01)

(58) Field of Classification Search
CPC . G06Q 30/02; G06Q 20/341; G06Q 20/1085; G07F 7/1008; G07F 19/20; G07F 7/08; G07B 15/02; G07B 15/00
USPC ................... 235/375, 380, 382, 379, 384, 381
See application file for complete search history.

(56) References Cited

U.S. PATENT DOCUMENTS

| 6,073,840 | A * | 6/2000 | Marion ......................... 235/381 |
|---|---|---|---|
| 6,424,300 | B1 | 7/2002 | Sanford et al. |
| 6,601,759 | B2 | 8/2003 | Fife et al. |
| 8,458,487 | B1 | 6/2013 | Palgon et al. |
| 2003/0105643 | A1 | 6/2003 | Chen et al. |
| 2003/0172028 | A1 | 9/2003 | Abell et al. |
| 2004/0025028 | A1 | 2/2004 | Takeuchi |
| 2005/0188005 | A1 | 8/2005 | Tune |
| 2006/0090073 | A1 | 4/2006 | Steinberg et al. |
| 2010/0094456 | A1 | 4/2010 | Simkins et al. |
| 2011/0095891 | A1 | 4/2011 | Fenkanyn |
| 2013/0054016 | A1 | 2/2013 | Canter et al. |
| 2014/0258132 | A1 | 9/2014 | Swamy et al. |
| 2015/0066770 | A1 | 3/2015 | Sagady et al. |

OTHER PUBLICATIONS

Invitation to Pay Additional Fees and Partial International Search for Corresponding Application No. PCT/US2014/052807, Issued Nov. 26, 2014.

(Continued)

*Primary Examiner* — Karl D Frech
(74) *Attorney, Agent, or Firm* — RatnerPrestia

(57) ABSTRACT

Methods, systems, and apparatus for obtaining application data using a card reader having a pass-through mode and an automatic polling mode are disclosed. Application data may be obtained by enabling the pass-through mode of the card reader, instructing the card reader to poll for an exchange event, identifying the exchange event, identifying a subject of the exchange event, and obtaining application data from the subject when the subject of the exchange event is a predefined application. The pass-through mode may be disabled and the automatic polling mode may be enabled after the application data is obtained. An account number from the subject of the exchange event may also be obtained for use in authorizing a vending transaction.

20 Claims, 3 Drawing Sheets

(56) References Cited

OTHER PUBLICATIONS

"QX 70 Tap to Self-Service", Mar. 31, 2013, XPO551445, Retrieved From the Internet: URL:http://www.verifone.de/media/2750908/VG13_004_QX700_DS_LTR_46326B_0313.pdf.

"UX 400 High-Tech Self-Service Solution", Jun. 30, 2013, XPO5511434, Retrieved From Internet: URL:http://global.verifone.com.media.30585 59/UX400_DS_A4.pdf.

"NFC Forum Device Requirements, High Level Conformance Requirements Revision V1.0", Jan. 26, 2010, XPO55065535, Retrieved From the Internet: URL:http://certification.nfc-forum.org/docs/nfc_forum_device_requirements.pdf.

"USA Technologies to Demonstrate Two New Cashless Payment Devices at NAMA Oneshow", Apr. 22, 2013, XP55151566, Retreived From Internet: URL:http://investor.usatech.com/common/download/download.cfm?companyid=usat&fileid=655094d0&filename=758058.pdf.

"UL Tests Entire Ecosystem for the Creation of Softcard", Oct. 15, 2012; XPO55151046, Retrieved From the Internet: URL:http://www.ul-ts.com/case-studies/finish/29-case-studies/224-the-creation-of-softcard.

International Search Report and Written Opinion for PCT/US2014/052807, Issued Jan. 23, 2015.

Office Action for U.S. Appl. No. 14/485,274 mailed May 28, 2015.

\* cited by examiner

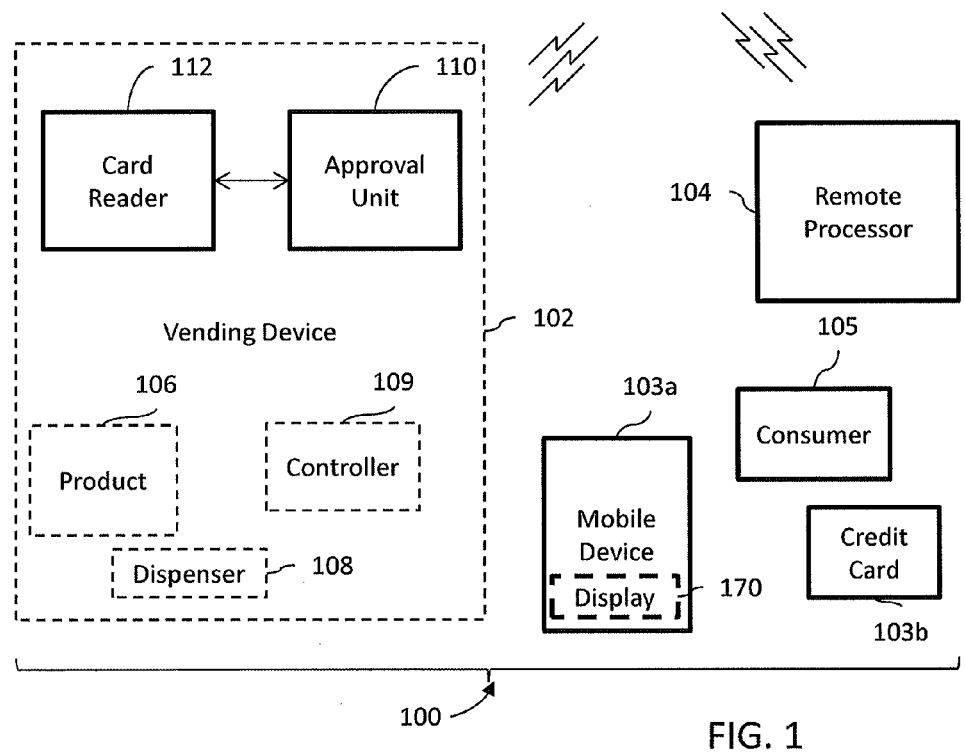
FIG. 1
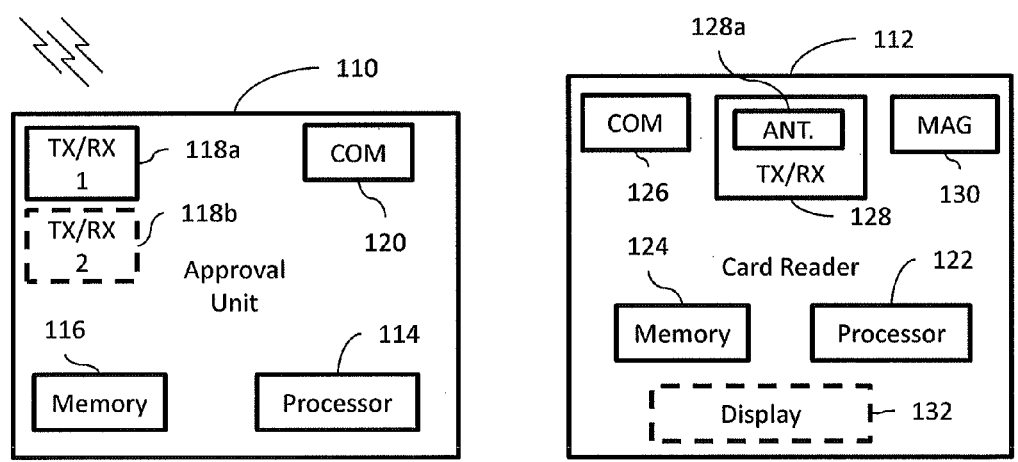
FIG. 1A
FIG. 1B

VENDING APPROVAL SYSTEMS, METHODS, AND APPARATUS USING CARD READERS

FIELD OF THE INVENTION

The invention relates to vending systems and, more particularly, to methods, systems, and apparatus for obtaining information from an application during a vending transaction, e.g., for use in loyalty programs.

BACKGROUND INFORMATION

Vending systems are often used to dispense products and/or services to consumers in locations where it would be impractical or inefficient to staff human beings to provide the products/services. Vending systems may be equipped with magnetic card readers and contact-less smart card readers (e.g., smart card readers that utilize near-field communication (NFC) technology) that may be used for cashless payment (e.g., credit cards). Additionally, sellers (vendors) want to implement customer loyalty programs to make their products more appealing to consumers. Improved methods, systems, and apparatus for implementing customer loyalty programs associated with cashless payment methods are desirable.

SUMMARY OF THE INVENTION

The invention is embodied in methods, systems, and apparatus for obtaining application data using a card reader having a pass-through mode and an automatic polling mode. Application data may be obtained by enabling the pass-through mode of the card reader, instructing the card reader to poll for an exchange event, identifying the exchange event, identifying a subject of the exchange event, and obtaining the application data from the subject of the exchange event when the subject of the exchange event is associated with a predefined application. The exchange event may be essentially any exchange of information. In some embodiments, the exchange event is an exchange of information associated with touching a smart card (card tap) or a phone (phone tap) to a communication area of a device. Exchange events may also occur from touching a phone to a particular device or touching a phone to another phone. The predefined application may be an electronic wallet and the application data may be entity identification (e.g., customer identification (ID)) and other types of information/data such as coupons, meta data, and other data for use in cashless payment transactions and customer loyalty programs, for example. The pass-through mode may be disabled and the automatic polling mode may be enabled after the application data is obtained. An account number from the subject of the exchange event may also be obtained for use in authorizing a vending transaction.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures:

FIG. 1 is a block diagram of a vending system in accordance with aspects of the invention;

FIG. 1A is a block diagram of an approval unit for use in the vending device of FIG. 1 in accordance with aspects of the invention;

FIG. 1B is a block diagram of a card reader for use in the vending device of FIG. 1 in accordance with aspects of the invention;

DETAILED DESCRIPTION OF THE INVENTION

Figure 2:
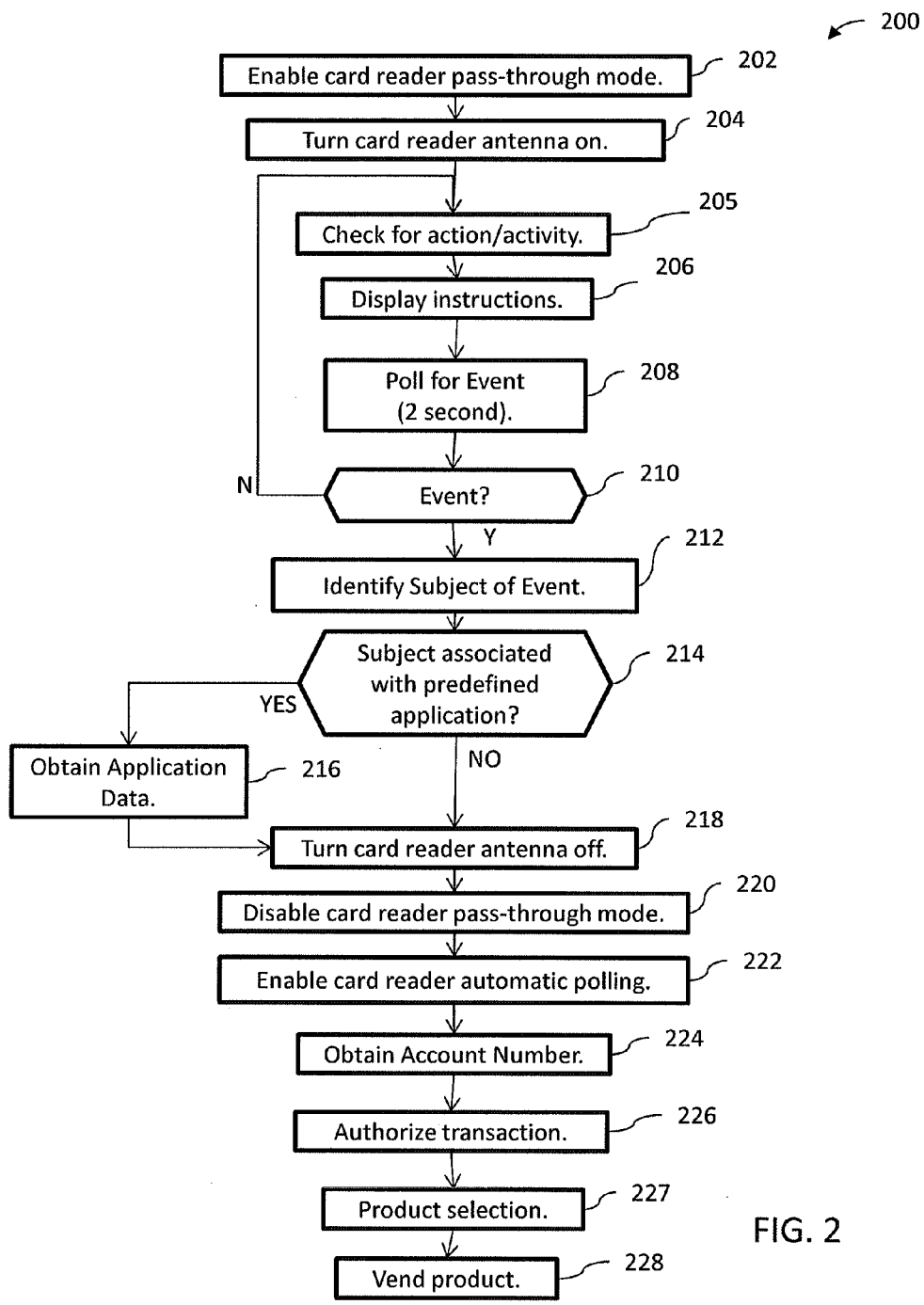
FIG. 2 is a flow chart of steps for obtaining application data and vending products in accordance with aspects of the invention.

FIG. 1 depicts a vending system 100. The vending system 100 includes a vending device 102 and a remote processor 104. Products 106 may be purchased by a consumer 105 at the vending device 102 and dispensed through a dispenser 108 under the control of a controller 109 of the vending device 102 such as a vending machine controller (VMC). The products 106 may be physical products such as cans of soda, boxes of candy, etc. and/or services such as a personal care service, e.g., a haircut. The vending device 102 may be a conventional vending machine or other device capable of dispensing/providing products 106.

The vending device 102 includes an approval unit 110 and a card reader 112. Although not illustrated, the controller 109 is coupled to the approval unit 110 and to a mechanism (not shown) for dispensing the product 106 stored within the vending devices 102 via the dispenser 108.

The approval unit 110 is configured to retrieve application data and payment information from a consumer. In an embodiment, the approval unit receives the application data and/or payment information via the card reader 112. In alternative embodiments, the approval unit may retrieve the application data and/or payment information directly without the use of a card reader.

The approval unit 110 may communicate the application data to a remote processor 104, e.g., for maintaining a customer loyalty program. The approval unit 110 may additionally communicate the payment information (e.g., wirelessly and/or via a network connection) to the remote processor 104 for verification. Upon verification of the payment information, the approval unit 110 may post funds to the vending device 102 (e.g., via the controller 109) to enable selection of a product 106 to be dispensed via the dispenser 108. The application data is data/information contained within an application (such as an electronic wallet like ISIS™) and/or is generated by an application where the information is retrieved by following an access protocol associated with the application. The application data may contain entity identification, offers, coupons, and other types of information associated with vending and/or customer loyalty programs. The entity identification may be information such as a unique number that may be used to identify an entity such as a consumer, a group of consumers, etc. For example, the entity identification could be a consumer ID associated with an account of a particular consumer, a group ID associated with accounts of a group of affiliated consumers, or other type of identifier.

The approval unit 110 may obtain the payment information from a mobile device 103a such as a smart phone or from a purchase card 103b. The purchase card 103b may be a conventional magnetic swipe credit or debit card or a smart card (e.g., a card with embedded integrated circuits capable of wireless communication). The mobile device 103a or a smart card may be used to implement an application such as an electronic wallet. Where application data is stored and/or generated by an application, the approval unit 110 may additionally obtain the application data from the mobile device 103a or smart card.

The mobile device 103a and the smart purchase cards 103b may each include a processor, a memory, and a transceiver for wireless communication. The mobile device 103a may additionally include a display 170 for displaying information, e.g., received from the approval unit 110. The mobile device 103a or smart purchase card 103b may be configured in accordance with, for example, a wireless communication standard such as a near-field communication (NFC) standard, a Bluetooth™ communication standard, or other communication standard capable of exchanging data over short distances. The mobile device 103a or smart purchase card 103b may include an application such as an electronic wallet that stores application data such as entity identification and payment information (e.g., a credit card number) in a memory and its processor may be configured to wirelessly communicate the application data and payment information via a transceiver. The application may be associated with a specific communication protocol that needs to be followed to access the application data that may be different than the protocol that needs to be followed to access the payment information. An example of a suitable application for use with the invention is an ISIS™ Mobile Wallet available from the Google play store hosted by Google Inc. of Mountain View, Calif. Suitable mobile devices 103a are available from AT&T, T Mobile, and Verizon. Purchase cards 103b may include a magnetic strip, wireless communication transceiver, electrical contacts and/or other structure for communicating payment information such as a credit card number.

FIG. 1A depicts an embodiment of an approval unit 110 in additional detail. The approval unit 110 includes a processor 114 and a memory 116. Memory 116 may store instructions that, when executed, configure the processor 116 to perform functions attributable to approval units described herein. The approval unit 110 additionally includes a first transceiver (TX/RX) 118a for wireless communication with the remote processor 104 (FIG. 1) and a communication port 120 for communication with the card reader 112 (e.g., via a wired connection to a corresponding communication port 126; FIG. 1B). Although not illustrated, the processor 114 is coupled to the memory 116, the first TX/RX 118, and the communication port 120 for sending data to and/or receiving data from each of these components. Suitable components for use in approval unit 110 will be understood by one of skill in the art from the description herein.

In an embodiment, the approval unit 110 may include a second transceiver 118b for wireless communication directly with a mobile device 103a or smart purchase card 103b instead of, or in addition to, the communication port 120. In accordance with this embodiment, the card reader 112 may be omitted. The first and second TX/RX 118a and 118b each include a transmitter, a receiver, and an antenna. In an embodiment, the first transceiver 118 is configured for wireless communication with a remote processor, e.g., via a cellular network, and the second transceiver 118b is configured for wireless communication with a mobile device 103a or smart payment card 103b in accordance with a wireless communication standard such as a near-field communication (NFC) standard, a Bluetooth™ communication standard, or other communication standard capable of exchanging data over short distances.

FIG. 1B depicts an embodiment of a card reader 112 in additional detail. The card reader 112 includes a processor 122 and a memory 124. Memory 124 may store instructions that, when executed, configure the processor 122 to perform functions attributable to card readers described herein. The card reader 112 additionally includes a communication port 126 for communication with the approval unit 110 (e.g., via a corresponding communication port 120; FIG. 1A), a transceiver (TX/RX) 128 for communicating with wireless devices (e.g., mobile devices 103a and smart credit cards 103b; FIG. 1), a magnetic reader 130 (e.g., for reading the magnetic stripe of a magnetic purchase card 103b), and an optional display 132 for displaying information to a consumer 105 using the vending device 102. The TX/RX 128 includes a transmitter, a receiver, and an antenna 128a. Although not illustrated, the processor 122 is coupled to the memory 124, the communication port 126, the TX/RX 128, the magnetic reader 130, and the display 132 for sending data to and/or receiving data from each of these components. Suitable components for use in card reader 112 will be understood by one of skill in the art from the description herein. In embodiments where the card reader 112 is omitted or the card reader does not include a display 132, the approval unit 110 may send information/instructions to the mobile device 103a for presentation on a display 170 of the mobile device.

The card reader 112 includes an automatic polling mode and a pass-through mode. The card reader 112 can be configured in these modes by the processor 122 in response to instructions received from the approval unit 110 via communication port 126. Additionally, the TX/RX 128 can be turned on and off by the processor 122 in response to instructions received from approval unit 110 via communication port 126.

In the automatic polling mode, the card reader 112 periodically transmits a sequence (e.g., every 20 milliseconds) via TX/RX 128 inquiring if an mobile device 103a or smart purchase card 103b is present. The carrier (e.g., RF carrier) of the sequence may be continuously on. This polling process may be controlled by the processor 122 of the card reader 112. When the card reader 112 receives a response, indicating that an mobile device 103a or smart purchase card 103b is present, the processor 122 of card reader 112 then requests payment information and notifies the approval unit 110 via the communication ports 120/126.

In the pass through mode, the polling operation of the card reader 112 is controlled by the approval unit 110. In this mode, the processor 114 of the approval unit 110 may periodically instruct the card reader 112 to transmits a signal (e.g., every 2 seconds) via TX/RX 128 inquiring if a mobile device 103a or smart purchase card 103b is present and, if present, requests its identification. If the source is associated within a predefined application (which may be determined based on the identification), application data is then requested. When a response to the signal is received by the card reader 112 it is passed through to the approval unit 110 via the communication ports 120/126.

FIG. 2 is a flow chart 200 of steps for obtaining application data from, for example, applications such as electronic wallets and for vending products in accordance with aspects of the invention. The steps of flow chart 200 are described below with reference to FIGS. 1, 1A, and 1B to facilitate description. It will be understood that other apparatus may be used to carry out the steps of flow chart 200. Additionally, it will be understood that one or more of the steps described herein may be performed in a different order and/or omitted without departing from the spirit and scope of the invention.

At block 202, a pass-through mode of a card reader is enabled. In an embodiment, the pass-through mode of the card reader 112 is enabled. The processor 114 of the approval unit 110 may enable the pass-through mode by sending an "enable pass-through mode" signal to the processor 122 of the card reader 112 via the communication ports 120/126. The processor 122 of the card reader 112 then configures the card reader 112 in pass-through mode in response to the "enable pass-through mode" signal.

At block 204, an antenna of a transceiver of the card reader is turned on. In an embodiment, the antenna of TX/RX 128 is turned on. The processor 114 of the approval unit 110 may turn on the antenna of TX/RX 128 by sending a "turn on antenna" signal to the processor 122 of the card reader 112 via the communication ports 120/126. The processor 122 of the card reader 112 then turns on the antenna of TX/RX 128 in response to the "turn on antenna" signal.

At block 205, a check for an action or activity is performed. The approval unit 110 may check if it is time for a scheduled activity to occur, e.g., a system update, and/or may check if an action has occurred, e.g., a cancel button has been pressed. If there is no action or activity, processing proceeds to block 206.

At block 206, consumer instructions are displayed by the card reader. Card reader 112 may display instructions such as "welcome," "please swipe card," "transaction processing." The processor 114 of the approval unit 110 may instruct the card reader 112 to display particular messages that are stored in the approval unit and/or are received from a remote processor 104.

At block 208, the card reader polls for an exchange event. If a wireless communication card/device (e.g., a mobile device 103a or smart purchase card 103b) is within communication range of the card reader 112, it will respond with a conventional acknowledgement. When the card reader 112 receives the acknowledgement, the acknowledgement or a representation thereof will be passed from the card reader 112 to the approval unit 110. This polling and acknowledgement is referred to herein as an exchange event. The exchange event may be essentially any exchange of information. In some embodiments, the exchange event is an exchange of information associated with touching a smart card (card tap) or a phone (phone tap) to a communication area of a device such as an NFC enabled device. Exchange events may also occur from touching a phone to a particular device or touching a phone to another phone.

If a card/device is not detected within range, the card reader 112 will wait a predetermined amount of time searching for a card/device. At the end of this predetermined time, the card reader 112 passes an indication to the approval unit 110 that a card/device was not within range.

In an embodiment, the exchange event is an NFC polling and acknowledgement. If a magnetic strip of a credit card 103b is swiped at the card reader during the NFC polling, the card reader 112 may capture the payment information and transfer the payment information to the approval unit 110. If the polling period is too long, e.g., greater than 5 seconds, the payment information from the magnetic swipe may be missed and/or the NFC polling may be disrupted. By setting the polling period to a predetermined value (for example, four seconds or less, e.g., two second), magnetic swipes of credit cards and NFC polling can both be accomplished. If a magnetic swipe occurs, processing may proceed at block 218 and the intervening steps may be omitted. The steps of blocks 218 and 220 may then be performed and the steps of blocks 222 and 224 may be omitted prior to authorizing the transaction and vending product in accordance with the steps of claims 226-228.

At block 210, a decision is made based on whether the exchange event has occurred. If the exchange event has not occurred, processing proceeds at block 205. If the exchange event has occurred (e.g., an NFC acknowledgement has been received by card reader 112 and passed to approval unit 110), processing proceeds at block 212. Approval unit 110 may make the decision based on whether the communication exchange (e.g., NFC polling and acknowledgement) has been completed.

At block 212, the subject of the exchange event is identified. The subject may be a purchase card 103b or a mobile device 103a. In an embodiment, the subject of the exchange event may be identified by the approval unit 110 from, for example, an NFC acknowledgment (which may contain data specifying its type). In another embodiment, the approval unit 110 (via the card reader 112) may initiate a communication sequence with the subject in response to receiving a communication such as an NFC acknowledgement. In accordance with this embodiment, the subject of the exchange event may be identified by the approval unit 110 from this communication sequence. The communication sequence may include a transmission inquiring whether the subject of the exchange event is associated with a predefined application such as a particular electronic wallet (e.g., an ISIS™ mobile wallet) using, for example, the protocol for that particular mobile wallet. If the subject responds with a communication that the approval unit 110 recognizes as associated with that predefined application, the subject will be identified as associated with that predefined application.

At block 214, a decision is made based on the subject of the exchange event. If the subject is identified as associate with at least one predefined application, e.g., a mobile device 103a or smart purchase card 103b that includes a predefined application recognized by the approval unit 110 such as an electronic wallet that stores application data such as entity identification, processing proceeds at block 216. Otherwise, processing proceeds at block 218. Approval unit 110 may make the decision based on a communication such as an NFC acknowledgement or a subsequent communication sequence that identifies the predefined application. In one embodiment, the approval unit 110 may recognize multiple predefined applications (e.g., multiple electronic wallets available from different vendors).

At block 216, which is reached if the subject is associated with a predefined application such as an electronic wallet, application data is obtained. Approval unit 110 may obtain the application data from the subject via the card reader 112. The application data may be presented by the application in response to a communication sequence between the approval unit 110 and the subject that conforms with a protocol stored by the subject for accessing the application data.

At block 218, the antenna of the transceiver of the card reader is turned off. In an embodiment, the antenna of TX/RX 128 is turned off. The processor 114 of the approval unit 110 may turn off the antenna of TX/RX 128 by sending a "turn off antenna" signal to the processor 122 of the card reader 112 via the communication ports 120/126. The processor 122 of the card reader 112 then turns off the antenna of TX/RX 128 in response to the "turn off antenna" signal.

At block 220, the pass-through mode of the card reader is disabled. In an embodiment, the pass-through mode of the card reader 112 is disabled. The processor 114 of the approval unit 110 may disable the pass-through mode by sending a "disable pass-through mode" signal to the processor 122 of the card reader 112 via the communication ports 120/126. The processor 122 of the card reader 112 then configures the card reader 112 to no longer operate in pass-through mode in response to the "disable pass-through mode" signal.

At block 222, an automatic polling mode of the card reader is enabled. In an embodiment, the automatic polling mode of the card reader 112 is enabled. The processor 114 of the approval unit 110 may enable the automatic polling mode by sending an "enable automatic polling mode" signal to the processor 122 of the card reader 112 via the communication ports 120/126. The processor 122 of the card reader 112 then configures the card reader 112 in automatic polling mode in response to the "enable automatic polling mode" signal.

At block 224, an account number is obtained. The approval unit 110 may obtain the account number from the card reader 112, which retrieves the account number (e.g., contained within an NFC communication) using its automatic polling mode. The account number may be a conventional credit card or debit card number (or an equivalent thereof) associated with a source of funds for making a purchase.

At block 226, the transaction is authorized. The approval unit 110 may authorize the transaction. To authorize the transaction, the approval unit 110 may send the obtained account number to a remote processing facility 104 (FIG. 1). The approval unit 110 may also send the application data (e.g., in the same or separate communication). The remote processing facility 104 processes the account number to determine that the account number is associated with a valid account and that the valid account has sufficient funds to make a purchase. If the account is valid and has sufficient funds, the remote processor 104 approves the transaction and sends a communication to the approval unit 110 notifying the approval unit 110 that the transaction is approved. The approval unit 110 then authorizes the transaction in response to the notification of approval. Additionally, the remote processing facility may process the application data (e.g., for use in conjunction with a customer loyalty program).

The approval unit 110 may authorize the transaction by indicating a vending approval (e.g., making funds available) to, for example, the controller 109 (e.g., VMC) of the vending device 102. The approval unit 110 may be a slave to the controller 109, which periodically polls a communication bus to which the approval unit is attached. The approval unit may provide an indicator in response to the polling indicating that a vend is authorized.

At block 227 a consumer makes a product selection and, at block 228, the selected product is vended. The controller 109 of the vending device 102 may control the dispensing of a product 106 from the dispenser 108 to vend the product.

In embodiments wherein the approval unit 110 includes a second transceiver 118b for wireless communication directly with a mobile device 103a or smart purchase card 103b, the card reader 112 may be omitted. In accordance with this embodiment, the processor may be configured to poll for a wireless payment device (e.g., a mobile device 103a or smart purchase card 103b) that is within communication range of the transceiver 118b to obtain payment information and application data, transmit the obtained payment information and application data to the remote processor, receive approval of the payment information from the remote processor, and post funds to, for example, the controller 109 in response to the received approval. The approval unit 110 may transmit information/instructions for the consumer to the mobile device 103a or smart purchase card 103b for presentation, e.g., on a display of the mobile device 103a.

Figure 3:
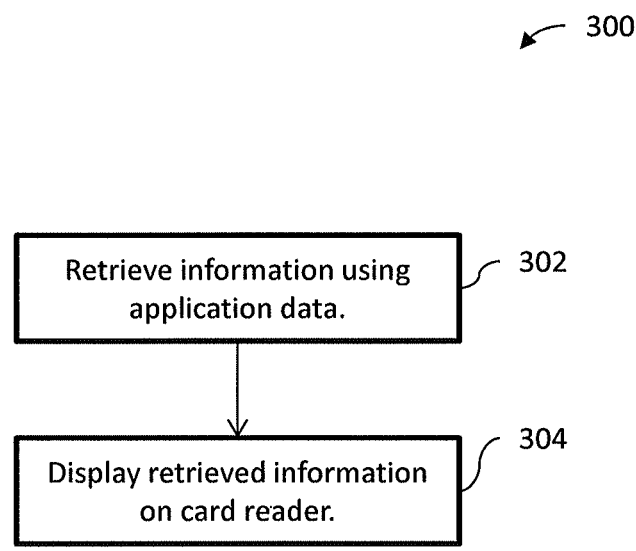
FIG. 3 is a flow chart of steps for displaying information on a card reader.

FIG. 3 depicts a flow chart 300 of steps for displaying information on a card reader in accordance with aspects of the invention. The steps of flow chart 300 are described below with reference to FIGS. 1, 1A, and 1B to facilitate description. It will be understood that other apparatus may be used to carry out the steps of flow chart 300. Additionally, it will be understood that one or more of the steps described herein may be performed in a different order and/or omitted without departing from the spirit and scope of the invention.

At block 302, information is retrieved using application data. The information may be retrieved by approval unit 110 from remote processor 104 using the application data obtained at block 216 (FIG. 2). The information may be a string of text characters (or other data from which text characters may be derived) for display on the display 132 of the card reader. The text characters may relate to a customer loyalty program, e.g., "Just two more beverages and your next one is free."

In an embodiment, the remote processor 104 sends data representing a string of text characters to the approval unit 110. In another embodiment, data representing a plurality of strings of text characters is stored in a memory 116 of the approval unit. In accordance with this embodiment, the remote processor 104 may send data identifying the particular string(s) of text data for display.

At block 304, the retrieved information is displayed by the card reader. The card reader 112 may display the retrieved information (e.g., a string of text characters) sent to the card reader by the approval unit 110. The approval unit 110 may periodically send the card reader 112 different text messages for display. Alternatively, the approval unit 110 may send multiple text messages at the same time and the card reader 112 may cycle through the received text messages provided by the approval unit 110. A formatted message may be sent including, for example, the number of screens to be displayed, the time delay between screens, the number of times to repeat the screens, and the data to present on each screen. Where the display 132 is configured to display two lines of text, the formatted message may additional specify the data to display on the first line and the data to display on the second line.

It is contemplated that the invention may be implemented using a computer (not shown). In this embodiment, one or more of the various components and steps described above may be implemented through software that configures the computer to perform the function of these components and/or steps. This software may be embodied in a computer readable medium, for example, a magnetic disc, an optical disk, a memory-card, or other tangible medium capable of storing instructions.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for obtaining application data using a card reader having a pass-through mode and an automatic polling mode, the method comprising:
    enabling the pass-through mode of the card reader;
    instructing the card reader to poll for an exchange event;
    identifying the exchange event;
    identifying a subject of the exchange event;
    obtaining application data from the subject of the exchange event when the subject of the exchange event is associated with one of at least one predefined application;
    disabling the pass-through mode and enabling the automatic polling mode of the card reader after the application data is obtained;
    obtaining an account number from the subject of the exchange event; and
    authorizing a vending transaction with the obtained account number.

2. The method of claim 1, further comprising
    disabling the pass-through mode and enabling the automatic polling mode without obtaining application data when the subject of the exchange event is not associated with any of the at least one predefined application.

3. The method of claim 1, wherein the card reader has an antenna and wherein the method further comprises:

turning on the antenna of the card reader after enabling the pass-through mode of the card reader; and turning off the antenna before disabling the pass-through mode of the card reader.

4. The method of claim 1, further comprising:

vending a product in response to the authorizing of the vending transaction.

5. The method of claim 1, further comprising:

retrieving information from a remote processor using the application data;

displaying the retrieved information.

6. The method of claim 5, wherein the displaying step comprises:

displaying the retrieved information on the card reader.

7. The method of claim 5, wherein the displaying step comprises:

transmitting the retrieved information to a mobile device for display on the mobile device.

8. The method of claim 1, wherein the application data includes a consumer identification (ID).

9. The method of claim 1, wherein the at least one predefined application includes an electronic wallet.

10. The method of claim 1, wherein the exchange event is at least one of a card tap, a phone tap, a phone to device tap, or a phone to another phone tap.

11. A system comprising:

a card reader having a pass-through mode and an automatic polling mode; and an approval unit coupled to the card reader, the approval unit configured to enable the pass-through mode of the card reader, instruct the card reader to poll for an exchange event, identify the exchange event, identify a subject of the exchange event, obtain application data from the subject of the exchange event when the subject of the exchange event is associated with one of at least one predefined application, disable the pass-through mode and enable the automatic polling mode of the card reader after the application data is obtained, obtain an account number from the subject of the exchange event, and authorize a vending transaction with the obtained account number.

12. The system of claim 11, wherein the approval unit is further configured to disable the pass-through mode and enable the automatic polling mode without obtaining the application data when the subject of the exchange event is not associated with any of the at least one predefined application.

13. The system of claim 11, wherein the card reader has an antenna and wherein the approval unit is further configured to turn on the antenna of the card reader after enabling the pass-through mode of the card reader and turn off the antenna before disabling the pass-through mode of the card reader.

14. The system of claim 11, wherein the approval unit is further configured to vend a product in response to the authorizing of the vending transaction.

15. The system of claim 11, wherein the card reader has a display and wherein the approval unit is further configured to retrieve information from a remote processor using the application data and display the retrieved information on the card reader display.

16. The system of claim 11, wherein the approval unit is further configured to retrieve information from a remote processor using the application data and transmit the retrieved information to a mobile device for display.

17. The system of claim 11, wherein the application data includes a consumer identification (ID).

18. The system of claim 11, wherein the at least one predefined application includes an electronic wallet.

19. The system of claim 11, wherein the exchange event is at least one of a card tap, a phone tap, a phone to device tap, or a phone to another phone tap.

20. A vending approval unit for use with a vending device, the vending approval unit comprising:

a radio frequency transceiver configured for communication with a remote processor;

a short range communication transceiver for communication with a payment device; and a processor coupled to the radio frequency transceiver, the short range communication transceiver, and the vending device, the processor configured to poll the payment device via the short range communication transceiver to obtain payment information and application data, transmit the obtained payment information and application data to the remote processor; receive approval of the payment information from the remote processor, and post funds to the vending device in response to the received approval.

* * * * *